L. H. CONNER.
PRESS.
APPLICATION FILED AUG. 8, 1908.
939,475.
Patented Nov. 9, 1909.
2 SHEETS—SHEET 2.
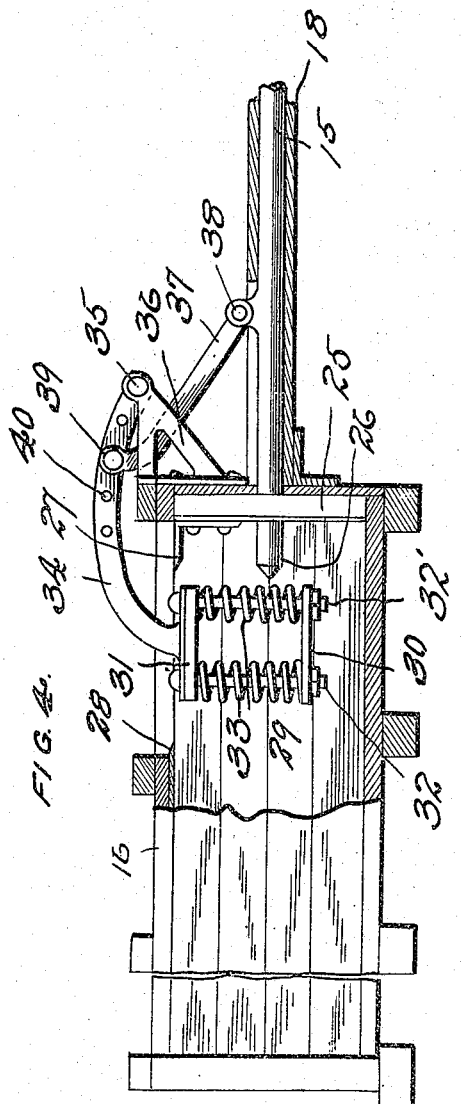
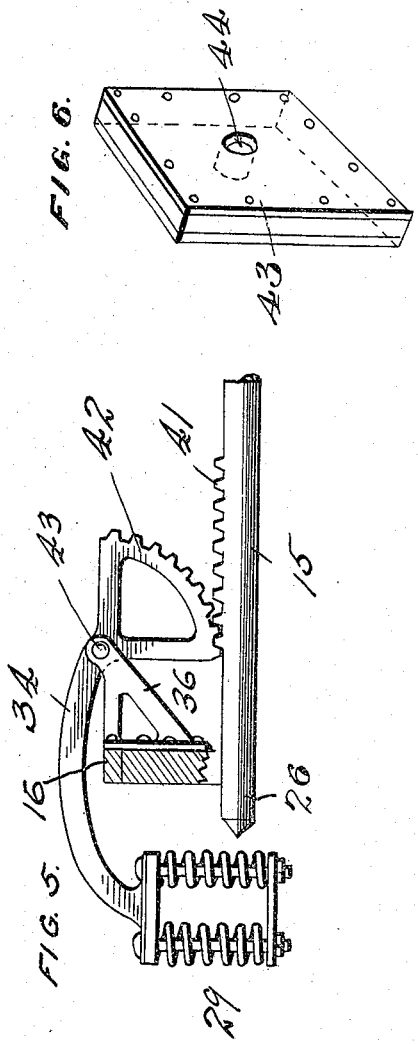

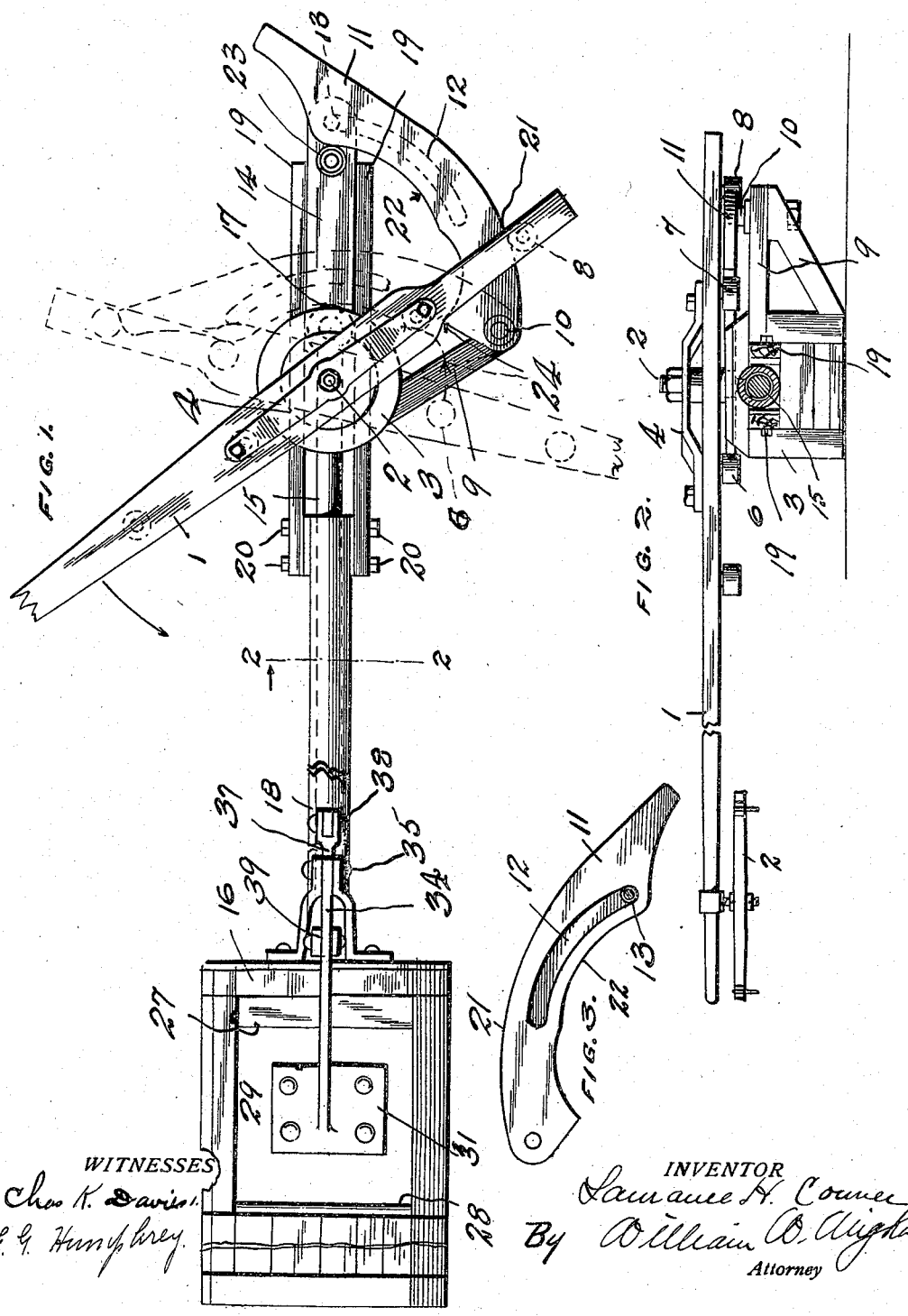

UNITED STATES PATENT OFFICE.

LAURANCE H. CONNER, OF ALTUS, OKLAHOMA.

PRESS.

939,475.　　　　Specification of Letters Patent.　　　Patented Nov. 9, 1909.

Application filed August 8, 1908. Serial No. 447,600.

*To all whom it may concern:*

Be it known that I, LAURANCE H. CONNER, a citizen of the United States, residing at Altus, in the county of Jackson and State of Oklahoma, have invented certain new and useful Improvements in Presses, of which the following is a specification.

My invention relates to improvements in presses.

The object of the invention is to improve the construction of the operative mechanism of hay presses whereby I provide a cheaper construction of device and at the same time produce an effective mechanism to be used, for instance, in baling hay.

The device is composed of comparatively few elements, thus rendering it simple and compact.

The invention consists in certain novel features of construction and combinations and arrangements of parts for reciprocating the plunger and feed mechanism hereinafter described and claimed.

In the accompanying drawings I have illustrated one example of the physical embodiment of my invention constructed according to the best mode I have so far devised for the practical application of the press, and one modified form of means for packing the hay as it is fed to the hay box.

While I have illustrated the invention as applied to a hay press, it will be understood that some parts thereof are applicable to devices wherein it is desired to change rotary power into reciprocating power.

In the drawings, Figure 1 is a plan view of a hay press illustrating the application of the invention. Fig. 2 is a section taken at line 2—2 Fig. 1. Fig. 3 is a plan view of the underside of the cam operating lever. Fig. 4 is a vertical sectional view of the hay box, showing the plunger head and hay packing mechanism. Fig. 5 shows a modified form of hay packer. Fig. 6 is a perspective view of a head block used in connection with the device.

It will be understood that the present device is operated by horse power and to this end I provide a beam 1, provided with a swingletree 2 to which the horse may be attached. This beam 1 is pivoted by means of bolt 2 to the pedestal or support 3 which is composed of short pieces of timber and elevated high enough to raise the beam above the operating mechanism. The iron brace or bar 4 is provided to give rigidity to the beam in its movement. Preferably this beam is provided with anti-friction rollers 5, 6, 7 and 8, the purpose of which will be described. Projecting from the pedestal 3 is an extension 9 upon which is formed a journal 10. On this journal 10 I pivot the cam operating lever 11. The underside of said lever is provided with a groove 12 as clearly shown in Fig. 3 and in this groove is adapted to travel roller 13 which is pivoted on the member 14 of the plunger. The plunger proper is a bar, as indicated at 15, having one end extending into the hay box 16 and its other end is preferably jointed at 17 to the member 14, although this joint is not necessary in all cases. The plunger is guided in its reciprocating movement at its forward end by means of the tube 18 and at the rear end by means of the two side bars 19, 19. The tube 18 is connected to the hay box 16 at one end and at its other end is connected by means of bolts 20 to the two guide bars 19.

Referring again to the cam operating lever 11 it will be observed that said lever is provided with a curved outer surface 21 extending a distance from its pivot, and with the inner curved surface 22 extending between the journal 10 and the outer end of the slot 12. In the position shown in full lines in Fig. 1 the anti-friction roller 8 is shown in contact with the curved surface 21 of the cam lever 11, and in this position the plunger head 30 is withdrawn from the hay in the box 16. In dotted lines in said figure I have shown the position of the elements when the plunger is at its extreme innermost position and the head of the plunger is pressing against the hay.

In operation the horse draws the beam in the direction of the arrow in Fig. 2 and the roller 8 which is in contact at 21 with the cam lever 11, rides down upon said cam lever and swings said lever on its pivot 10. The anti-friction roller 23 on the plunger 14 is in contact with the cam lever as shown and as the cam lever is swung on its pivot 10, the curved surface 22 rides down on the roller 23, and by this means the plunger is moved toward the left until the cam lever assumes the position shown in dotted lines. Upon further rotation of the beam 1 the anti-friction roller 6 will strike the cam lever at point 24 and a continuation of the movement of the beam 1 swings the cam lever on its pivot 10 back to the position shown in full lines. During the movement of these parts as the plunger goes in toward the hay box, the friction roller 13 travels in the groove 12 toward the pivot 10 and the friction roller 23 also travels in this direction on the curved surface 22. On the outward movement of the plunger the operation of the two rollers 13 and 23 is reversed as will be understood.

In addition to serving as a guide for the plunger 15, the tube 18 also serves as a shield to prevent the horse from coming in contact with moving parts of the machinery.

Referring to Fig. 4, I will now describe the mechanism for packing and baling the hay in the hay box 16. The plunger 15 is provided with a head 25, through which the end 26, of the plunger 15 projects. At the top of the plunger head I attach a knife edge 27, which is adapted to coöperate with the metallic edge or share 28, secured at the underside of the top of the box 16. Thus as the plunger 15 reciprocates, the knife 27, co-acting with the edge 28, severs the loose hay at the top of the bale which is being formed and cuts off all unpacked hay, thus producing a shapely and compact bale when the same is tied up. In order to pack the hay as it is fed into the box 16, I provide a packing mechanism 29. The packer 29 consists of a bottom plate 30 and a top plate 31, which are connected by means of the two rods or bars 32 and 32'. The plates 30 are adapted to slide on the rods 32, 32, and a pair of springs 33, 33, are interposed between the upper and lower plates. The packer 29 is supported on the pivoted arm 34, which has a bearing at 35 in the extension bracket 36, which latter is secured to the hay box. A link 37 having one end pivoted at 38 to the plunger bar 15, and its other end pivoted at 39 to the arm 34, is adapted to raise and lower the packer 29 as the plunger bar 15 reciprocates. Adjustment of arm 34 in its connection with the link 37 may be made by means of the holes 40 disposed throughout the length of the arm 34.

The springs 33 are for the purpose of relieving the feed packing mechanism in the event that too large a charge of hay is fed into the hay box. In such case, the plate 30 is forced up against the tension of the springs 33. I desire to form an opening the length of the bale for ventilating the hay, and to this end the head block 43 is provided with a perforation 44 through which the plunger head or end 26 passes.

In Fig. 5, I have illustrated a modification of the means for raising and lowering the packer 29. In this instance, a rack 41 is provided on the plunger bar 15, and the teeth of this rack are in mesh with teeth on the segmental rocker arm 42, which is pivoted at 43 to the bracket 36 and is integral with the arm 34. The operation of the device in this instance is obvious. As the plunger bar 15 reciprocates, the teeth 40 thereon engage with the teeth on the segment 42, and the forward and backward movement of the plunger bar 15 raises and lowers the packer 29, as will be understood.

From the above description taken in connection with the drawings, it is obvious that I have produced a mechanism in which the plunger works in a direct straight line and thus has advantage over many other constructions in devices of this character.

By the use of the extension 26 on the plunger head I form a block of hay with an opening therein and this opening provides ventilation through the bale of hay, thus insuring the hay against mold.

It is further evident that I have provided a device which fulfils the purposes set forth as the objects of my invention.

Having thus fully described my invention, what I claim as new and desire to secure by Letters Patent is:—

1. The combination with a rotatable beam having anti-friction rollers thereon, of a pivoted cam lever adapted to be operated by said beam, a reciprocating plunger, an anti-friction member thereon adapted to engage said cam lever, and a movable joint between said cam lever and plunger.

2. The combination with a pivoted cam lever of a reciprocating plunger having an anti-friction roller thereon adapted to engage said lever, a movable joint between said lever and plunger and rotatable means for moving said cam lever on its pivot.

3. The combination with a pivoted cam lever and plunger having an anti-friction roller thereon to engage said lever, a second anti-friction member carried by said plunger, a groove in said cam lever adapted to receive said second anti-friction member and rotatable means adapted to swing said cam lever on its pivot.

4. The combination with the reciprocating plunger having guide bars therefor and provided with an anti-friction roller, of a cam lever having a movable connection with said plunger, curved bearing surfaces provided on the inner and outer faces of said cam lever and a rotatable beam having an anti-friction roller to engage the outer curved face of said lever; and the anti-friction roller on the plunger adapted to engage the inner curved surfaces on said lever.

5. The combination with the cam lever having a plunger connected thereto and provided with curved bearing surfaces of a rotatable beam provided with an anti-friction roller to engage one of said curved surfaces to move the plunger in one direction and a second anti-friction roller adapted to engage said cam lever to move it in reverse direction.

6. In a press the combination with a pivoted cam lever a reciprocating plunger having an anti-friction roller thereon adapted to engage said lever, a movable joint between said lever and plunger, and means for moving said cam lever on its pivot, of a hay box and a perforated head therein, a head and extension on the plunger, an arm pivotally supported on the hay box, a link connecting said plunger and arm, guide rods attached to the arm and a plate slidable thereon, and cushions between said plate and arm, substantially as described.

In testimony whereof I affix my signature, in presence of two witnesses.

LAURANCE H. CONNER.

Witnesses:
  A. C. FAGIN,
  CAGE BEACH.